(12) United States Patent
Joo et al.

(10) Patent No.: US 11,683,866 B2
(45) Date of Patent: Jun. 20, 2023

(54) MICROWAVE OVEN

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Modam Joo, Foshan (CN); Li Hong, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 728 days.

(21) Appl. No.: 16/676,137

(22) Filed: Nov. 6, 2019

(65) Prior Publication Data

US 2020/0146115 A1 May 7, 2020

(30) Foreign Application Priority Data

Nov. 6, 2018 (CN) .......................... 201811314174.X
Nov. 19, 2018 (CN) .......................... 201811377645.1

(51) Int. Cl.
| | | |
|---|---|---|
| *H05B 6/64* | (2006.01) | |
| *E05F 3/04* | (2006.01) | |
| *F16F 13/04* | (2006.01) | |
| *E05B 65/00* | (2006.01) | |
| *E05F 5/02* | (2006.01) | |

(52) U.S. Cl.
CPC .......... *H05B 6/6414* (2013.01); *E05B 65/00* (2013.01); *E05F 3/04* (2013.01); *E05F 5/02* (2013.01); *F16F 13/04* (2013.01); *H05B 6/6417* (2013.01); *E05Y 2201/21* (2013.01); *E05Y 2900/308* (2013.01)

(58) Field of Classification Search
CPC ..... H05B 6/6414; H05B 6/6417; E05B 65/00; E05F 3/04; E05F 5/02; E05Y 2201/21; E05Y 2900/308; F16F 13/04
See application file for complete search history.

(56) References Cited

U.S. PATENT DOCUMENTS

| | | | | |
|---|---|---|---|---|
| 3,659,068 A | * | 4/1972 | Duffner ................ | H05B 6/6417 219/719 |
| 3,846,607 A | * | 11/1974 | Bucksbaum ......... | H03K 17/292 327/569 |
| 4,101,750 A | * | 7/1978 | Doner .................. | H05B 6/6417 219/722 |

(Continued)

*Primary Examiner* — Victor D Batson
*Assistant Examiner* — Matthew J Sullivan
(74) *Attorney, Agent, or Firm* — Seed IP Law Group LLP

(57) ABSTRACT

The present disclosure relates to the field of kitchen appliances, and has disclosed a microwave oven, which comprises a cabinet and a door, a damper assembly is mounted on one side of the cabinet facing the door in a way that it produces damping force for preventing the door from closing when the door approaches to a closed position. In the present disclosure, a damper assembly is arranged on one side of the cabinet facing the door; thus, the damper assembly can effectively decrease the speed of collision of the door with the cabinet in the closing process when the door approaches to a closed position, and thereby greatly reduce the noise generated when the door is closed. In that way, not only the grade of the product is improved, but also the user experience and satisfaction is improved.

11 Claims, 8 Drawing Sheets

(56) References Cited

U.S. PATENT DOCUMENTS

| | | | | |
|---|---|---|---|---|
| 4,321,445 | A * | 3/1982 | Kristof | H05B 6/6417 |
| | | | | 219/722 |
| 4,340,799 | A * | 7/1982 | Ueda | H05B 6/6435 |
| | | | | 704/E15.04 |
| 4,663,505 | A * | 5/1987 | Drake | H01H 3/163 |
| | | | | 219/722 |
| 4,764,648 | A * | 8/1988 | Resh | H01H 3/163 |
| | | | | 292/DIG. 69 |
| 5,895,601 | A * | 4/1999 | Kim | H05B 6/6417 |
| | | | | 219/757 |
| 6,300,610 | B1 * | 10/2001 | Han | H05B 6/6414 |
| | | | | 200/50.01 |
| 7,091,458 | B2 * | 8/2006 | Lee | H05B 6/6417 |
| | | | | 292/52 |
| 9,777,523 | B2 * | 10/2017 | Choi | E06B 3/34 |
| 9,832,820 | B2 * | 11/2017 | Darney | H05B 6/6414 |
| 9,913,322 | B2 * | 3/2018 | Davies | H05B 6/6417 |
| 10,631,374 | B1 * | 4/2020 | Fowler | H05B 6/6441 |
| 10,829,953 | B2 * | 11/2020 | Esterle | E05C 3/12 |
| 2011/0290791 | A1 * | 12/2011 | Yamaguchi | H05B 6/6414 |
| | | | | 219/756 |
| 2013/0069512 | A1 * | 3/2013 | Zimmer | H05B 6/6417 |
| | | | | 312/326 |
| 2020/0124291 | A1 * | 4/2020 | Reid | H05B 6/6417 |
| 2021/0372186 | A1 * | 12/2021 | Cai | E05F 5/02 |
| 2022/0107913 | A1 * | 4/2022 | Hartlage | G06F 13/4282 |

\* cited by examiner

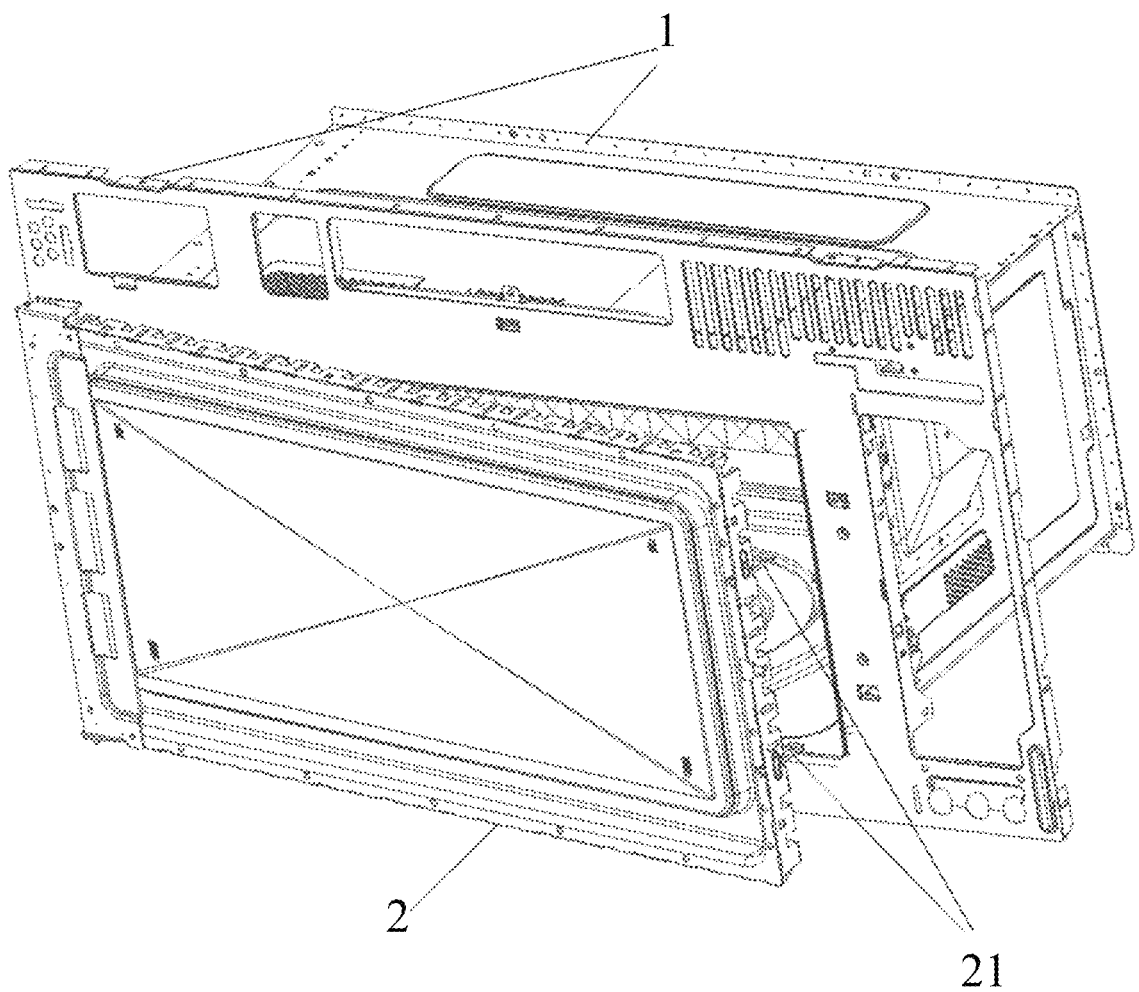
Fig. #1

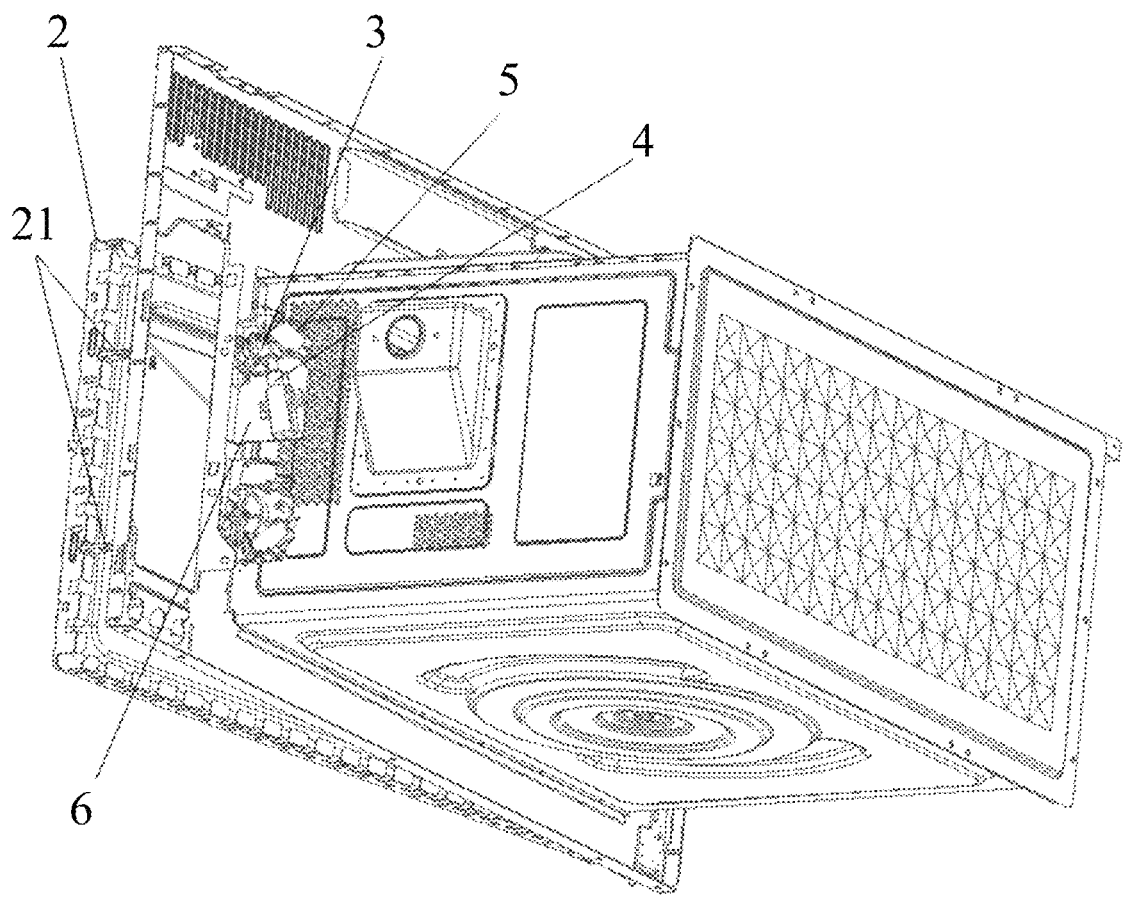
*Fig. #2*

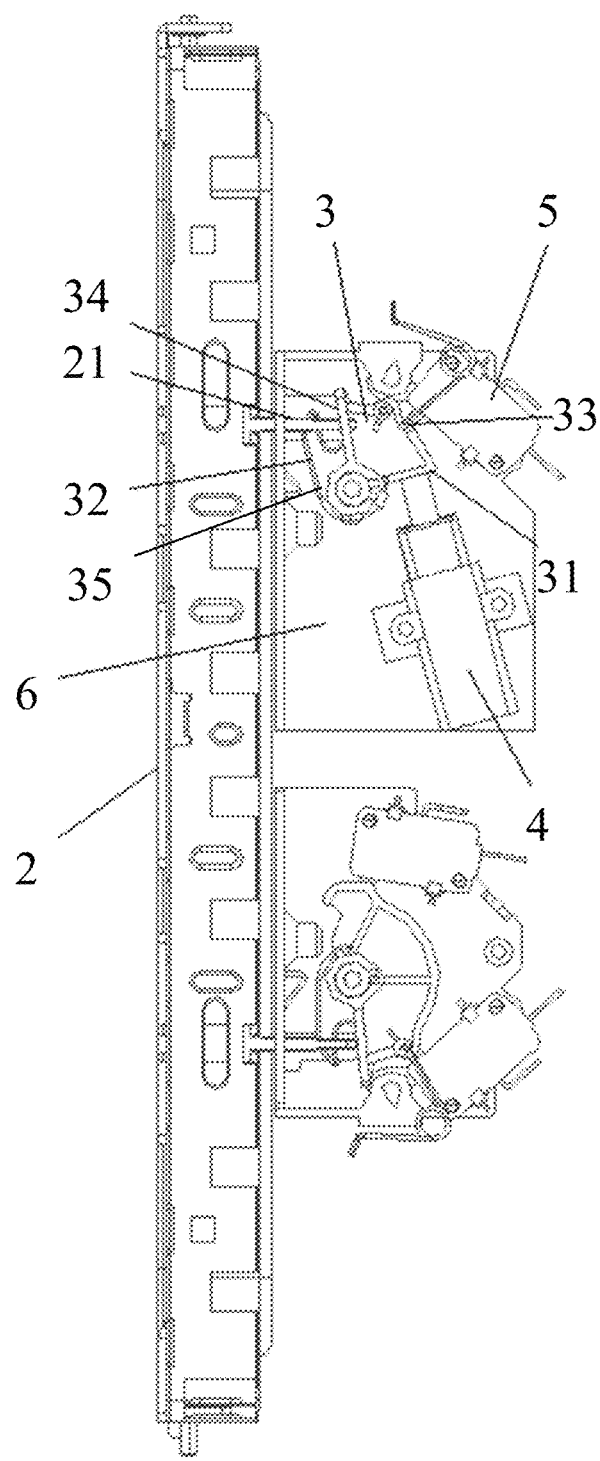
Fig. #3

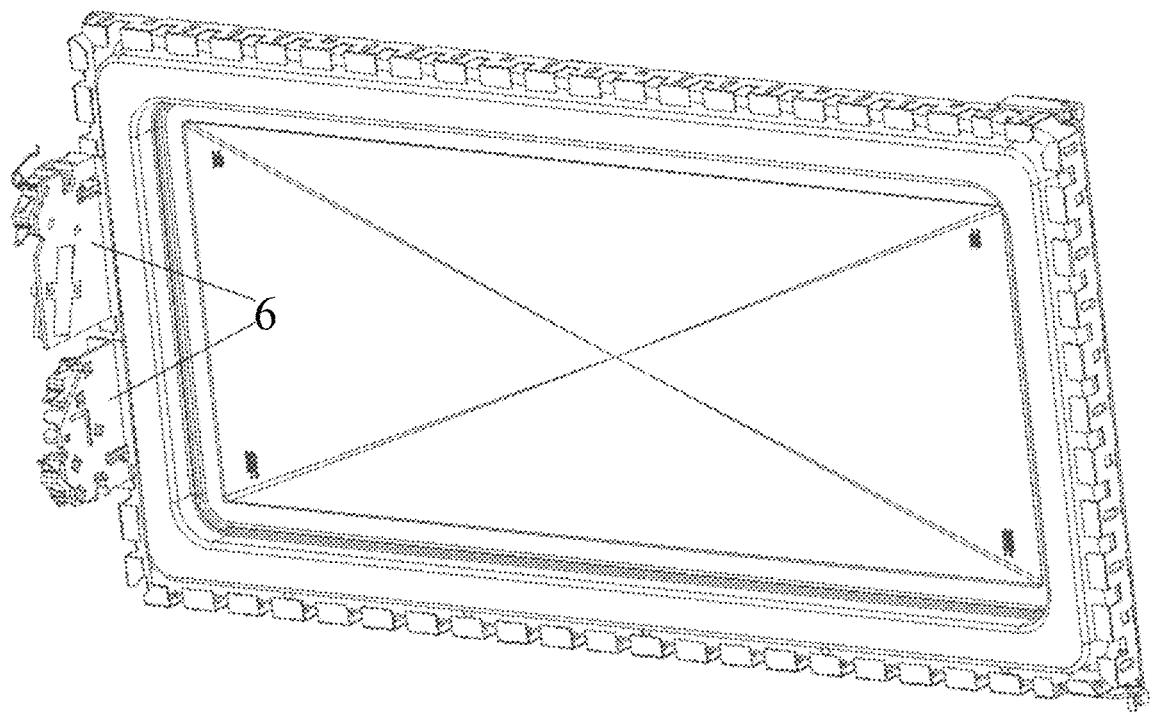
Fig. #4

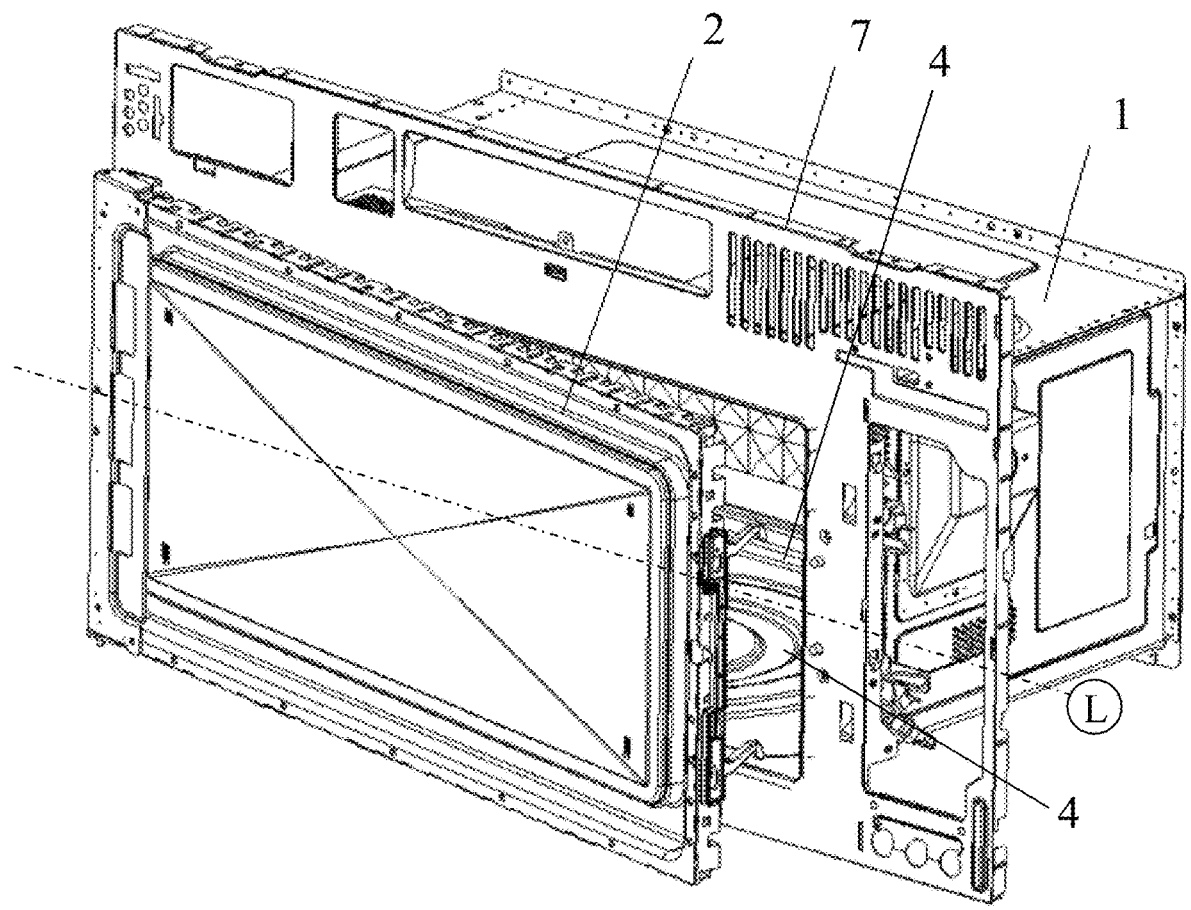
Fig. #5

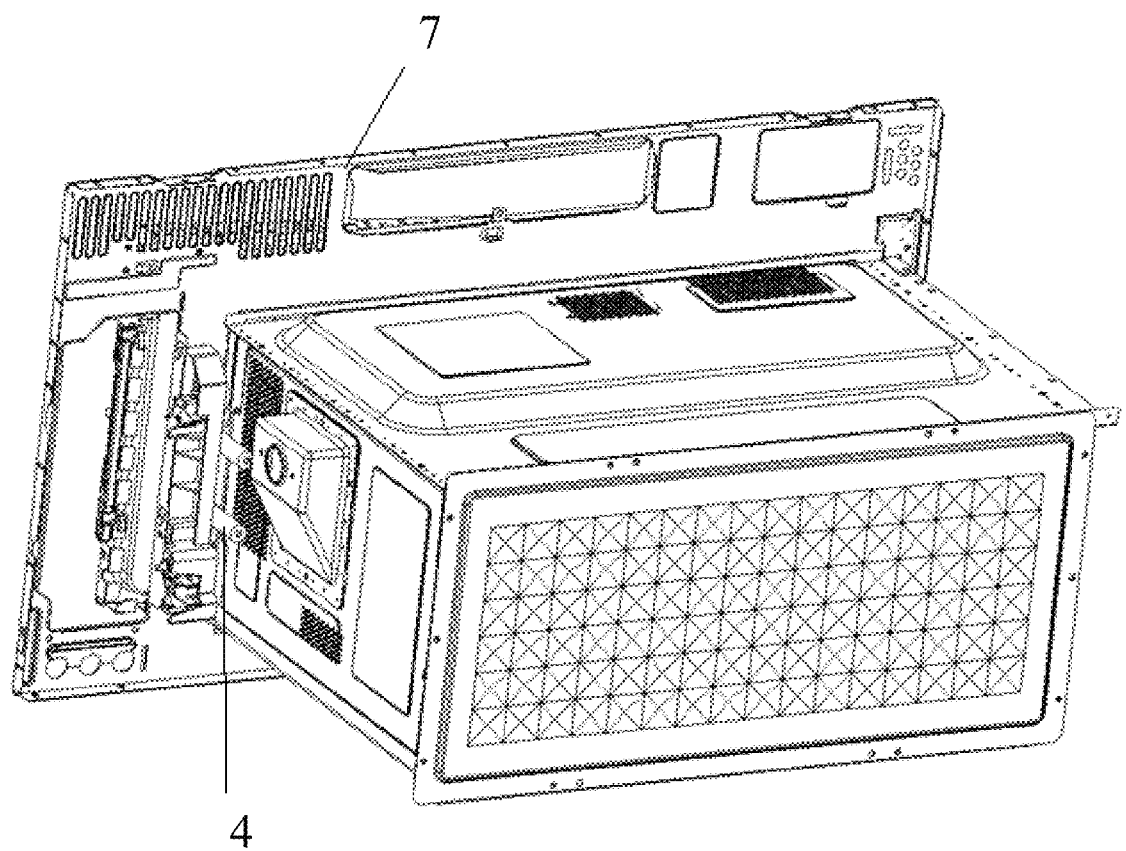
Fig. #6

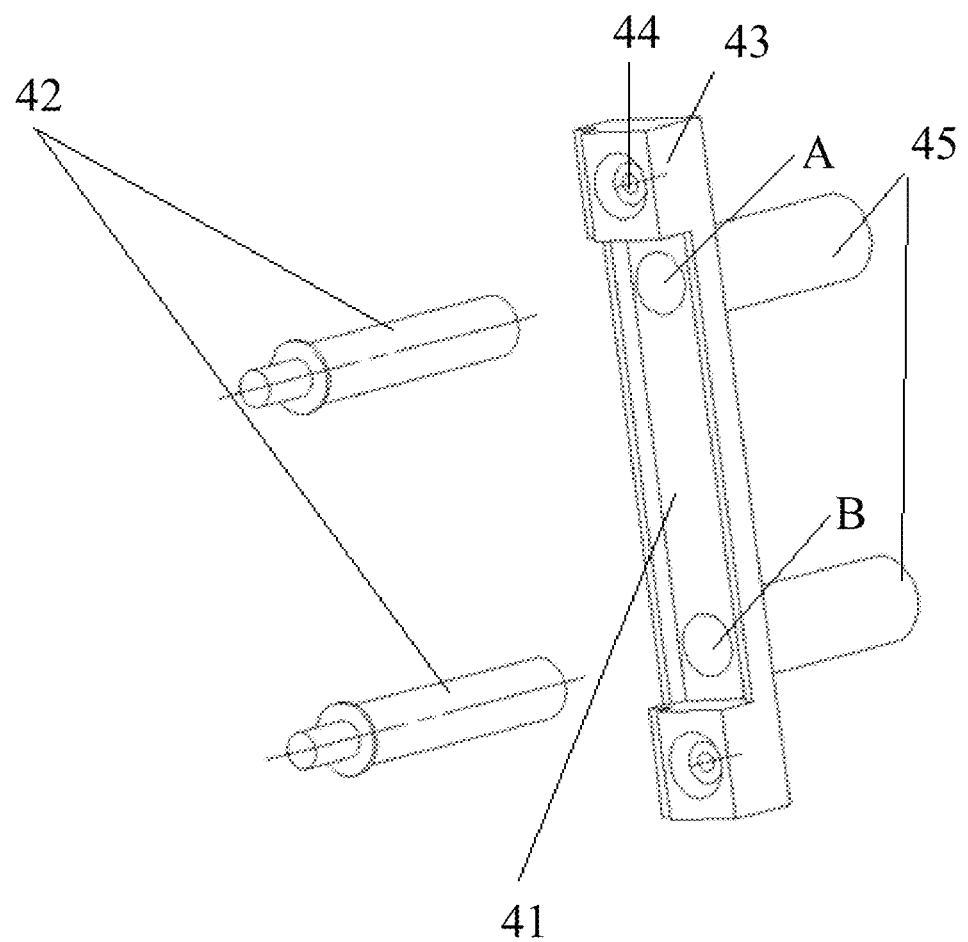
Fig. #7

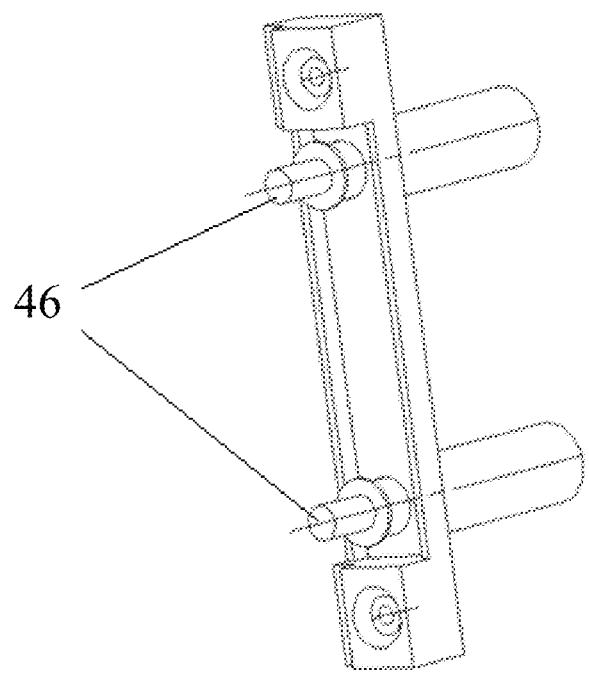
Fig. #8

MICROWAVE OVEN

CROSS REFERENCE TO RELATED APPLICATIONS

The present application claims for priority to the Chinese Patent Application No. 201811314174.X filed on Nov. 6, 2018 entitled as "Door Interlocking Mechanism and Home Appliance" and the Chinese Patent Application No. 201811377645.1 filed on Nov. 19, 2018 entitled as "Microwave Oven", which are specifically and entirely incorporated here by reference.

BACKGROUND

Technical Field

The present disclosure relates to the field of kitchen appliances, in particular to a microwave oven.

Description of the Related Art

As people's material living standard is improved rapidly and new residential building patterns are optimized continuously, kitchen appliances have been widely popularized and developed. As a major sort of products in kitchen appliances, microwave ovens have characteristics such as wide varieties, diversified functions, and convenient use, etc., and bring great convenience to people's life. In order to meet the requirements of microwave oven consumers, domestic and foreign microwave oven research and development organizations and manufacturers have applied various advanced modern technologies to microwave ovens, and have launched a series of novel and advanced microwave oven products. Microwave oven products are gradually developed towards energy saving and environmental protection, beneficial for health, easy and simple operation, intelligent optimization, and multi-function directions, etc.

More importantly, the user experience and satisfaction of kitchen appliances become more and more important, especially in the fiercely competitive market environment. However, on most of the microwave ovens sold in the market, especially side-pulling door microwave ovens, the door rigidly collides with the front panel of the cabinet when it is closed, making a "bang" sound, which results in a compromised user experience, gives a sense of failure-prone product, and produces noise.

BRIEF SUMMARY

The object of the present disclosure is to provide a microwave oven, on which the door produces less noise when it is closed, the vibration of the front panel of the cabinet is reduced, the front panel is protected so that it is not easy to deform in the process of use, and the user experience of the product is improved.

To attain the above-mentioned object, the present disclosure provides a microwave oven, which comprises a cabinet and a door, wherein a damper assembly is installed on one side of the cabinet facing the door in a way that it generates damping force to prevent the door from closing when the door approaches to a closed position.

Optionally, a door lock assembly for locking the door in the closed position is arranged on the cabinet, and the damper assembly is integrated in the door lock assembly.

Optionally, the door lock assembly comprises an interlocked driving member and a circuit switch, and a damper connecting part, a lock connecting part, and a switch triggering part are arranged on the interlocked driving member; wherein, in a door closing process that the door is transited from an open state to a closed state, the interlocked driving member is subjected to inward pushing force of the door so that the damper connecting part comes into contact with the damper assembly; in the closed state of the door, the circuit switch is triggered by the switch triggering part to actuate, and the lock connecting part locks the door.

Optionally, the interlocked driving member is in a rotatable cam shape, and the damper connecting part, the lock connecting part, and the switch triggering part are arranged on the periphery of the interlocked driving member in the circumferential direction in a manner that they are spaced apart from each other.

Optionally, the microwave oven comprises a door locking part that is arranged on the door and extends toward the cabinet, and a rotary connecting part is arranged on the periphery of the interlocked driving member; wherein, in the door closing process, the door locking part abuts against the rotary connecting part to apply inward rotational pushing force; in the closed state, the door locking part and the lock connecting part are locked to each other.

Optionally, the door locking part has a through-hole of locking part, and the lock connecting part is in a barb shape and hooked to the through-hole of locking part in the closed state.

Optionally, the damper assembly comprises a hydraulic damper, and the damper connecting part abuts against a piston push rod of the hydraulic damper in the door locking process.

Optionally, the damper assembly comprises a torsion spring connected to the damper connecting part.

Optionally, the microwave oven is set to a locked state before the circuit switch is triggered to actuate, the circuit switch comprises a micro-switch, and the switch triggering part abuts against an actuating reed of the micro-switch in the closed state.

Optionally, the microwave oven comprises a cabinet with a fixed support plate inside it and a door that is pulled to open from one side, the door comprises a hinged end hinged to the cabinet and a free end that can be locked with the lock connecting part together in the closed state, and all of the interlocked driving member, the damper assembly, and the circuit switch are mounted on the fixed support plate.

Optionally, the door is pivotally connected to the cabinet and has a pivotal side edge part and an opening/closing side edge part, and the damper assembly is arranged accordingly to the opening/closing side part.

Optionally, the damper assembly comprises a damper support and dampers, damper housings that extend to the side away from the door are formed on the damper support, damper mounting holes are formed in the damper housings, and the dampers are mounted in the damper mounting holes and extend toward the door.

Optionally, damping heads made of a flexible material are formed on the top of the dampers, and abut against the door when the door is closed.

Optionally, the dampers are linear dampers.

Optionally, each damper comprises a damper shell fixed to the damper mounting hole, a piston is slidably mounted inside the damper housing, and the damping head is connected to the piston in a transmission manner, so as to generate damping force for preventing the door from closing when the door is to be closed.

Optionally, the damper mounting holes comprise a first damper mounting hole and a second damper mounting hole that are arranged in a way that they are spaced apart from each other, the door comprises a center line of door perpendicular to a pivotal axis of the door, and the first damper mounting hole and the second damper mounting hole are arranged symmetrically with respect to the center line of door.

Optionally, screw hole bases are formed on the two ends of the damper support, a screw hole is formed in each screw hole base, and the damper support penetrates through fasteners of the screw holes and is connected to the front panel of the cabinet.

Optionally, the microwave oven is a side-pulling door microwave oven.

In the microwave oven provided in the present disclosure, since a damper assembly is mounted on one side of the cabinet facing the door, the impact of the door of the microwave oven can be buffered effectively and the door closing speed and time can be decreased effectively by means of the damping force generated by the damper assembly when the door is closed, and thereby the impact force of the door to the cabinet can be reduced. Thus, the service life of the product is prolonged, the user experience on the use of the product is improved, and the grade of the product is improved.

Other features and advantages of the present disclosure will be further detailed in the embodiments hereunder.

BRIEF DESCRIPTION OF THE SEVERAL VIEWS OF THE DRAWINGS

The accompanying drawings, which constitute a part of the present disclosure, are provided to facilitate further understanding of the present invention; the illustrative embodiments and associated description in the present disclosure are provided to explain the present disclosure, and shall not be deemed as constituting any undue limitation to the present disclosure. In the figures:

FIG. 1 is a front side 3D view of the microwave oven in a first embodiment of the present invention;

FIG. 2 is a back side 3D view of the microwave oven in FIG. 1;

FIG. 3 is a schematic structural diagram of the door lock assembly in FIG. 1;

FIG. 4 is a back side 3D view of the front panel of the cabinet in FIG. 1, illustrating the fixed support plate arranged on the front panel in the embodiment;

FIG. 5 is a front side 3D view of the microwave oven in a second embodiment of the present invention;

FIG. 6 shows the installation effect of the damper assembly in FIG. 5;

FIG. 7 is an exploded view of the structure of the damper assembly in FIG. 6; and FIG. 8 is a 3D structural view of the damper assembly in FIG. 6.

In the figures:

| | |
|---|---|
| 1 Cabinet | 2 Door |
| 3 Interlocked driving member | 4 Damper assembly |
| 5 Circuit switch | 6 Fixed support plate |
| 7 Front panel | |
| 21 Door locking part | 31 Damper connecting part |
| 32 Lock connecting part | 33 Switch triggering part |
| 34 Rotary connecting part | 35 Rotating part |
| 41 Damper support | 42 Damper |
| 43 Screw hole base | 44 Screw hole |
| 45 Damper housing | 46 Damping head |
| A First damper mounting hole | B Second damper mounting hole |
| L Center line of door | |

DETAILED DESCRIPTION

Hereunder some embodiments of the present disclosure will be detailed with reference to the accompanying drawings. It should be understood that the embodiments described here are only provided to describe and explain the present disclosure rather than constitute any limitation to the present disclosure.

It should be noted that the embodiments and the features in the embodiments can be combined freely, provided that there is no confliction among them.

In the present disclosure, unless otherwise specified, the words that denote directions or orientations, such as "above", "below", "top", and "bottom", etc., are usually used to describe the relative position relations among the components with respect to the direction shown in the accompanying drawings or the vertical, plumb, or gravity direction.

Hereunder the present disclosure will be detailed in embodiments with reference to the accompanying drawings.

In the conventional sense, a kitchen is only a meal-making place, and there are few additional functional requirements for kitchen. However, with the improvement of people's living standard and the progress of applied technology and design concepts, the kitchen has become an open space reflecting personal tastes, as well as a studio for free cooking art creation. Therefore, the kitchen has become a key point that can't be underestimated in home decoration as well as a place with the highest scientific and technological content in home. As the soul of a contemporary kitchen, kitchen appliances have gradually liberated people from the tedious cooking work. At the same time, people's requirements for kitchen appliances have continuously increased. As a major sort of kitchen appliances, microwave ovens must inevitably exhibit an improved sense of science and technology and a high grade of product, in order to meet people's pursuit for quality of life nowadays.

However, the door closing mechanism of existing microwave ovens is as follows: a door hanger that can slide up and down is mounted on the door 2, a spring on the door always pulls the door hanger downward to keep it at the bottom end, and an interlocking support with a slope is mounted on the cabinet 1. To close the door 2, external force must be applied to push the door hanger to move upward against the acting force of the spring and clamp up the slope of the interlocking support. After climbing over the vertex of the slope, the door hanger rapidly slides down to a low point under the action of the spring and drives the door 2 to impact the cabinet 1 and finally the door is closed. Therefore, high noise is generated when the door is closed, causing degraded user experience of the product and hampering the improvement of product grade.

In view of the above problem, the present disclosure provides a novel microwave oven. In an embodiment shown in FIGS. 1-8, the microwave oven comprises a door 2 and a cabinet 1, wherein, particularly a damper assembly 4 is mounted on one side of the cabinet 1 facing the door 2 in a way that the damper assembly 4 can generate damping force for preventing the door 2 from closing when the door 2 approaches to a closed position. Wherein, the microwave oven may be a separate microwave oven merely having a microwave heating function, or a kitchen appliance compatible and assembled with dish washer, sterilizer, baking oven and other functions, or a multi-functional integrated electric appliance integrated with other functions to meet the demand in the kitchen, or may be used as an embedded electrical appliance in the entire kitchen.

In the present disclosure, the door 2 of the microwave oven is damped by the damper assembly 4 to slow down the door closing movement. The designed structure is simple and convenient for installation. In addition, the damping force generated by the damper assembly 4 can effectively buffer the impact and decrease the closing speed and time of the door 2 of the microwave oven when the door 2 is closed. Thus, the impact force produced by the door 2 colliding with the front panel 7 of the cabinet 1 can be effectively weakened, the noise generated by the mechanical collision can be reduced greatly and thereby a remarkable noise reduction effect is attained, and the user experience is greatly improved. In addition, since the impact force between the door 2 and the front panel 7 is decreased, the possible damage to the front panel 7 by the door 2 can be avoided. Thus, not only the service life of the microwave oven can be prolonged, but also the esthetic appearance of the front panel 7 is ensured to improve the product grade.

Specifically, the damper assembly 4 may be arranged appropriately in a variety of ways. For example, the damper assembly 4 may be arranged separately on the cabinet 1 to buffer the impact of the door 2, or the damper assembly 4 may be integrated in an existing component in the cabinet to buffer the impact of the door 2, etc.

In a case where a door lock assembly for locking the door 2 at a closed position is arranged on the cabinet 1 of the microwave oven, the damper assembly 4 may be integrated in the door lock assembly in order to improve the assembly performance. Furthermore, integrating the damper assembly 4 in the door lock assembly can reduce the modification to the original structure of the microwave oven and is helpful for reducing the renovation cost of the microwave oven.

Optionally, as shown in FIGS. 1 and 4, the door lock assembly comprises an interlocked driving member 3 and a circuit switch 5 arranged in the cabinet 1, and a damper connecting part 31, a lock connecting part 32, and a switch triggering part 33 are arranged on the interlocked driving member 3.

When the door 2 is transited from an open state to a closed state (i.e., in a door closing process), the interlocked driving member 3 is subjected to inward pushing force of the door 2, so that the damper connecting part 31 comes into contact with the damper assembly 4. When the door 2 is in the closed state, the circuit switch 5 is triggered by the switch triggering part 33 to actuate, and the lock connecting part 32 locks the door 2.

Thus, with the door lock assembly mounted on the cabinet 1, in the above-mentioned door closing process, the door 2 exerts inward pushing force on the interlocked driving member 3, so that the damper connecting part 31 comes into contact with the damper assembly 4 before the circuit switch 5 is triggered by the switch triggering part 33 to actuate. The damper assembly 4 exerts buffering force on the damper connecting part 31 to balance off the inward pushing force of the door 2 partially. Thus, the impact energy between the door 2 and the cabinet 1 is effectively buffered, and thereby the noise produced when the door 2 is closed is greatly reduced, and the user experience is improved. Furthermore, with such an arrangement, it is unnecessary to open a hole in the front panel 7 of the cabinet 1 for the damper assembly 4 to extend out so that the damper assembly 4 directly abuts against the door 2 to mitigate the impact of the door 2. In that way, it is unnecessary to redesign and remold the front panel 7, and the overall appearance of the microwave oven can be improved.

In an embodiment, the interlocked driving member 3 may be configured in a rotatable cam shape, and the structure is shown in FIGS. 1-4. In that case, the damper connecting part 31, the lock connecting part 32, and the switch triggering part 33 are arranged in the circumferential direction on the periphery of the interlocked driving member 3 in a manner that they are spaced apart from each other. Furthermore, the microwave oven comprises a door locking part 21 that is arranged on the door 2 and extends toward the cabinet 1, and a rotary connecting part 34 is arranged on the periphery of the interlocked driving member 3. Wherein, the interlocked driving member 3 is also provided with a rotating part 35, and the damper connecting part 31, the lock connecting part 32, and the switch triggering part 33 can rotate around the rotating part 35.

In the door closing process in the above embodiment, the door locking part 21 abuts against the rotary connecting part 34 to apply inward rotational pushing force, and thereby pushes the interlocked driving member 3 to rotate around the rotating part 35. During the rotation, the damper connecting part 31 pioneers to abut against the damper assembly 4, and thereby the closing speed of the door 2 is obviously decreased at that point. When the door 2 completely closes the cabinet 1, the noise produced at the moment of door closing is lower and doesn't affect the user experience too much since the collision is weakened. In addition, when the door 2 is in the closed state, the door locking part 21 and the lock connecting part 32 lock each other, i.e., the circuit switch 5 can be triggered by the switch triggering part 33 only when the door 2 is completely locked. Therefore, the safety and reliability are higher.

In another embodiment, the interlocked driving member 3 comprises a sliding column that can slide back and forth. In the closing process of the door 2, the door 2 can abut against the front end of the sliding column and push the sliding column to slide back, while the damper assembly 4 can abut against the back end of the sliding column to decrease the closing speed of the door 2. Of course, in addition to transferring the damping force generated by the damper assembly 4 to the door through the above-mentioned rotational or linear movement to decrease the closing speed of the door, alternatively the interlocked driving member 3 may be configured in another appropriate way to mitigate the impact of the door 2, which will not be discussed here.

Furthermore, a through-hole of locking part is arranged in the door locking part 21, and the lock connecting part 32 is configured in a barb shape. In the closed state, the lock connecting part 32 is hooked in the through-hole of locking part, and thereby the door 2 is closed and locked to the cabinet 1. However, it should be noted that the door locking part 21 and the lock connecting part 32 in the present disclosure may also be configured as other structures capable of locking each other, and are not limited to the afore-mentioned hooking structures.

In addition, the damper assembly 4 comprises a hydraulic damper. The damper connecting part 31 abuts against a piston push rod of the hydraulic damper in the door closing process, and the piston push rod exerts buffer force on the damper connecting part 31 in a compressed state. Wherein, the hydraulic damper may be a spring-return damper or air-return damper, but is not limited to such dampers. Alternatively, the damper assembly 4 may comprise a torsional spring connected to the damper connecting part 31.

Specifically, the torsion spring comprises a fixed arm fixed in the cabinet 1 and a torsion arm configured to abut against the damper connecting part 31. Thus, in the closing process of the door 2, the torsion arm can rotate along the center of the torsion spring under the pushing force of the damper connecting part 31, and the torsion arm can apply buffer force to the damper connecting part 31 at the same time.

In order to ensure safe use and ensure that the circuit switch 5 can be triggered to actuate only after the door 2 is completely locked, the microwave oven shall be set to the locked state before the circuit switch 5 is triggered to actuate. Thus, when the object to be heated in the cabinet 1 (e.g., water, dish, rice, etc.) is subject to microwave heating, leakage of the microwaves in the cabinet 1 through the clearance between the door 2 and the cabinet 1 can be avoided effectively, and the microwave oven has higher safety and reliability.

Furthermore, the circuit switch 5 comprises a micro-switch; in addition, when the door 2 is in the closed state, the switch triggering part 33 abuts against an actuating reed of the micro-switch, so that the micro-switch is switched on. Moreover, the circuit switch 5 may be configured as a switch in a different form. For example, the circuit switch 5 may be used to trigger a different electric appliance (e.g., electric rice cooker, air conditioner, TV set, etc.) to a locked state or unlocked state.

Optionally, a handle is arranged on the door. Thus, the lock connecting part 32 can be disengaged from the through-hole of locking part by exerting outward acting force on the handle, and thereby the door 2 can be transited from the closed state to the open state; in addition, in the opening process of the door 2, the damper assembly 4 is reset, while the circuit switch 5 is in the locked state again.

To facilitate compact mounting and accurate assembling of the components of the door lock assembly, a fixed support plate 6 may be arranged on the front panel of the cabinet 1, and the interlocked driving member 3, the damper assembly 4, and the circuit switch 5 are mounted on the fixed support plate 6, so that the working mechanism of the door lock assembly can be realized and the operating reliability of the door lock assembly can be improved.

In addition, the microwave oven comprises a cabinet 1 and a side-pulling door 2, or comprises a cabinet 1 and a downward-pulling door 2, but is not limited to such components. Wherein, the door 2 comprises a hinged end that is hinged to the cabinet 1 and a free end that is locked with the lock connecting part 32 in the closed state. Thus, for the free end of the door 2, the user may apply inward acting force toward the cabinet 1 to close the door 2.

Optionally, as shown in FIG. 6, the door 2 of the microwave oven is pivotally connected to the cabinet 1 and has a pivotal side edge part and an opening/closing side edge part, and the damper assembly 4 is arranged accordingly to the opening/closing side edge part. In that way, compared to an arrangement that the damper assembly 4 is arranged accordingly to the pivotal side edge part of the door, the damper assembly 4 is arranged accordingly to the opening/closing side edge part in this technical scheme. Thus, the structure is simple and resistant to damage, and is easy to install; in addition, it is beneficial for stability and balance of the door 2 after the door 2 is closed.

Moreover, in the door closing process, the door 2 can be pivoted to the closed position quickly from a large opening angle, and the damper assembly 4 attains a buffer effect on the door 2 only when the door is close to the closed position. Thus, the violent impact of the door 2 on the cabinet 1 can be avoided and the noise produced when the door is closed can be reduced; in addition, the operating efficiency of door closing can be ensured, and the user experience can be improved significantly.

Optionally, the damper assembly 4 is separately arranged on the cabinet 1. As shown in FIGS. 7 and 8, in a specific embodiment of the damper assembly 4, the damper assembly 4 comprises a damper support 41 and dampers 42. A damper housing 45 extending to the side away from the door 2 is formed on the damper support 41, damper mounting holes are formed in the damper housing 45, and the dampers 42 are mounted in the damper mounting holes and extend toward the door 2. In that way, the dampers 42 can be mounted firmly in the damper housing 45, and the damper housing 45 attains a fixing and supporting effect. Therefore, the dampers 42 will not slip out or get loose easily during long-term use of the microwave oven, and the arrangement is beneficial for structural stability.

In addition, in this embodiment, in order to ensure the balance and sealing performance of the door 2 after the door 2 is closed, as shown in FIG. 5, the damper mounting holes comprise a first damper mounting hole A and a second damper mounting hole B that are arranged in a way that they are spaced apart from each other, and the door 2 comprises a center line L of the door perpendicular to the pivotal axis of the door 2, wherein, the first damper mounting hole A and the second damper mounting hole B are symmetrically arranged with respect to the center line L of the door.

Optionally, as shown in FIG. 7, screw hole bases 43 are formed on the two ends of the damper support 41, and a screw hole 44 is formed in each screw hole base 43. Thus, the damper support 41 penetrates through fasteners of the screw holes 44 and is connected to the front panel 7 of the cabinet 1. It can be understood that corresponding screw holes are arranged in the cabinet 1 (e.g., two screw holes are arranged in the front panel 7 at corresponding positions), so that the damper assembly 4 can be mounted firmly in the cabinet 1. The damper assembly 4 may be mounted in the cabinet 1 by fasteners such as screws or bolts. Thus, the operation is simple and effective, and the arrangement is beneficial for installation; in addition, the user experience and product grade can be improved.

In addition, damping heads 46 made of a flexible material are formed on the top of the dampers 42, and can abut against the door 2 when the door 2 is closed. Please see FIG. 8. Since the damping heads 46 are made of a soft and elastic material, they can be deformed and absorb the impact force when the door 2 is closed and abuts against the damping heads 46. Thus, the damping heads 46 attain a good impact reduction effect, and are helpful for reducing the noise produced by the mechanical collision between the door 2 and the cabinet 1, and thereby achieve a first stage of shock absorption and noise reduction for the door 2. In the continuous closing process of the door, the impact force of the door can be transferred via the damping heads 46 to the damper bodies, and then the damper bodies achieve a second stage of shock absorption and noise reduction for the door 2. Thus, through two stages of shock absorption and noise reduction by means of the damping heads 46 of the dampers 42 and the damper bodies, less noise or even no noise is produced when the door 2 is closed. Such an arrangement is more helpful for reducing noise when the door of the microwave oven is closed. Wherein, the damping heads 46 may be made of a flexible material, such as silica gel, rubber, or a similar material.

Furthermore, damping head alignment grooves corresponding to the damping heads 46 are arranged on the door 2. Thus, in the door closing process, the damping heads 46 of the dampers 42 can be aligned to and extended into the damping head alignment grooves, and thereby the free ends of the damping heads 46 abut against the bottoms of the damping head alignment grooves. In that way, the door 2 can be closed smoothly and steadily, and the damping heads 46 can be prevented from scratching the surface of the door 2.

Specifically, the dampers 42 may be selected from many types of dampers. For example, the dampers 42 may be linear dampers (e.g., hydraulic dampers) or rotational dampers, etc. Linear dampers don't require additional axial force to maintain balance during use, and have a simple structure and are convenient to use. Therefore, in the present embodiment, linear dampers may be selected for the dampers 42. Furthermore, linear dampers such as hydraulic dampers have advantages including compact structure, quick dynamic response, and long service life, etc.

Furthermore, as shown in FIGS. 7 and 8, each damper 42 comprises a damper shell fixed to the damper mounting hole, a piston is slidably mounted inside the damper shell, and the damping head 46 is connected to the piston in a transmission manner, so as to generate damping force for preventing the door 2 from closing when the door 2 is to be closed. Thus, in the door closing process, the impact force of the door 2 can be transferred via the damping heads 46 to the pistons of the damper bodies, and thereby the dampers 42 achieve a second stage of shock absorption and noise reduction for the door 2. Thus, not only the closing speed of the door 2 can be decreased, but also the noise produced during door closing can be reduced effectively. Wherein, the dampers 42 may be spring return linear dampers or air return linear dampers, but are not limited to such dampers.

Specifically, the microwave oven may be a side-pulling door microwave oven, i.e., the microwave oven may comprise a cabinet 1 and side-pulling door 2. Alternatively, the microwave oven may be a downward-pulling door microwave oven, i.e., the microwave oven may comprise a cabinet 1 and a downward-pulling door 2. Of course, alternatively the microwave oven may be an upward-pulling door microwave oven, i.e., the microwave oven may comprise a cabinet 1 and an upward-pulling door 2. However, the microwave oven is not limited to those types of microwave ovens. Wherein, the door 2 comprises a hinged end that is hinged to the cabinet 1 and a free end that is locked with the lock connecting part 32 in the closed state. Thus, for the free end of the door 2, the user may apply inward acting force toward the cabinet 1 to close the door 2.

It should be noted specially that the other components and their functions of the microwave oven according to embodiments of the present disclosure are well known to those having ordinary skill in the art, and will not be detailed here to reduce redundancy.

While the present disclosure is described above in some preferred embodiments, the present disclosure is not limited to those preferred embodiments. Any modification, equivalent replacement, and improvement made without departing from the spirit and principle of the present disclosure shall be deemed as falling into the protected domain of the present disclosure.

In addition, it should be noted that the specific technical features described in above specific embodiments may be combined in any appropriate form, provided that there is no conflict among them. To avoid unnecessary repetition, various possible combinations are not described specifically in the present disclosure.

Moreover, different embodiments of the present disclosure may also be combined freely as required, as long as the combinations don't deviate from the ideal and spirit of the present disclosure. However, such combinations shall also be deemed as falling into the scope disclosed in the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microwave oven, comprising:
  a cabinet;
  a door; and
  a door lock assembly for locking the door at a closed position, the door lock assembly being arranged on the cabinet,
  wherein the door lock assembly includes:
    a damper assembly mounted on one side of the cabinet facing the door in a way that the damper assembly produces damping force against the door in a direction opposite a direction the door moves as the door approaches a closed position,
    an interlocked driving member; and
    a circuit switch, a damper connecting part, a lock connecting part, and a switch triggering part arranged on the interlocked driving member;
  wherein, in a door closing process that the door is transited from an open position to the closed position, the interlocked driving member is subjected to an inward pushing force of the door so that the damper connecting part comes into contact with the damper assembly; and
  wherein when the door is in the closed position, the circuit switch is triggered by the switch triggering part to actuate and the lock connecting part locks the door.

2. The microwave oven according to claim 1, wherein;
  the damper connecting part, the lock connecting part, and the switch triggering part are arranged on a periphery of the interlocked driving member in a circumferential direction; and
  the damper connecting part, the lock connecting part, and the switch triggering part are spaced apart from one another.

3. The microwave oven according to claim 2, further comprising:
  a door locking part arranged on the door and extending toward the cabinet; and
  a rotary connecting part arranged on the periphery of the interlocked driving member;
  wherein in the door closing process, the door locking part abuts against the rotary connecting part to apply an inward rotational pushing force; and
  wherein when the door is in the closed position, the door locking part and the lock connecting part are locked to one another.

4. The microwave oven according to claim 1, wherein the damper assembly includes a hydraulic damper having a piston push rod, and wherein the damper connecting part abuts against the piston push rod of the hydraulic damper when the door is the closed position.

5. The microwave oven according to claim 1, wherein the microwave oven is configured to be set to a locked state before the circuit switch is triggered to actuate.

6. The microwave oven according to claim 1, wherein the cabinet includes a fixed support plate arranged inside the cabinet;
wherein the door includes a hinged end hinged to the cabinet and a free end that can be locked with the lock connecting part when the door is in the closed position; and
wherein all of the interlocked driving member, the damper assembly, and the circuit switch are mounted on the fixed support plate.

7. The microwave oven according to claim 1, wherein the door is pivotally connected to the cabinet and has a pivotal side edge part and an opening/closing side edge part, and
wherein the damper assembly is arranged corresponding to the opening/closing side edge part.

8. The microwave oven according to claim 7, wherein the damper assembly includes:

a damper support;
a plurality of damper housings that extend to a side away from the door and are formed on the damper supports;
a plurality of damper mounting holes that are formed in the plurality of damper housings; and
a plurality of dampers that are mounted in the damper mounting holes and extend toward the door.

9. The microwave oven according to claim 8, wherein the plurality of dampers include damping heads of a flexible material formed on tops of the dampers, the damping heads abutting against the door when the door is in the closed position.

10. The microwave oven according to claim 9, wherein the plurality of dampers are linear dampers.

11. The microwave oven according to claim 10, wherein each damper includes:
a damper shell fixed in the damper mounting hole;
a piston slidably mounted inside the damper shell; and
a damping head connected to the piston in a transmission manner.

* * * * *